Aug. 30, 1949.　　　　　M. S. ALVES　　　　　2,480,392
BALE AND SACK LOADER
Filed March 7, 1947　　　　　　　　　　　4 Sheets-Sheet 1
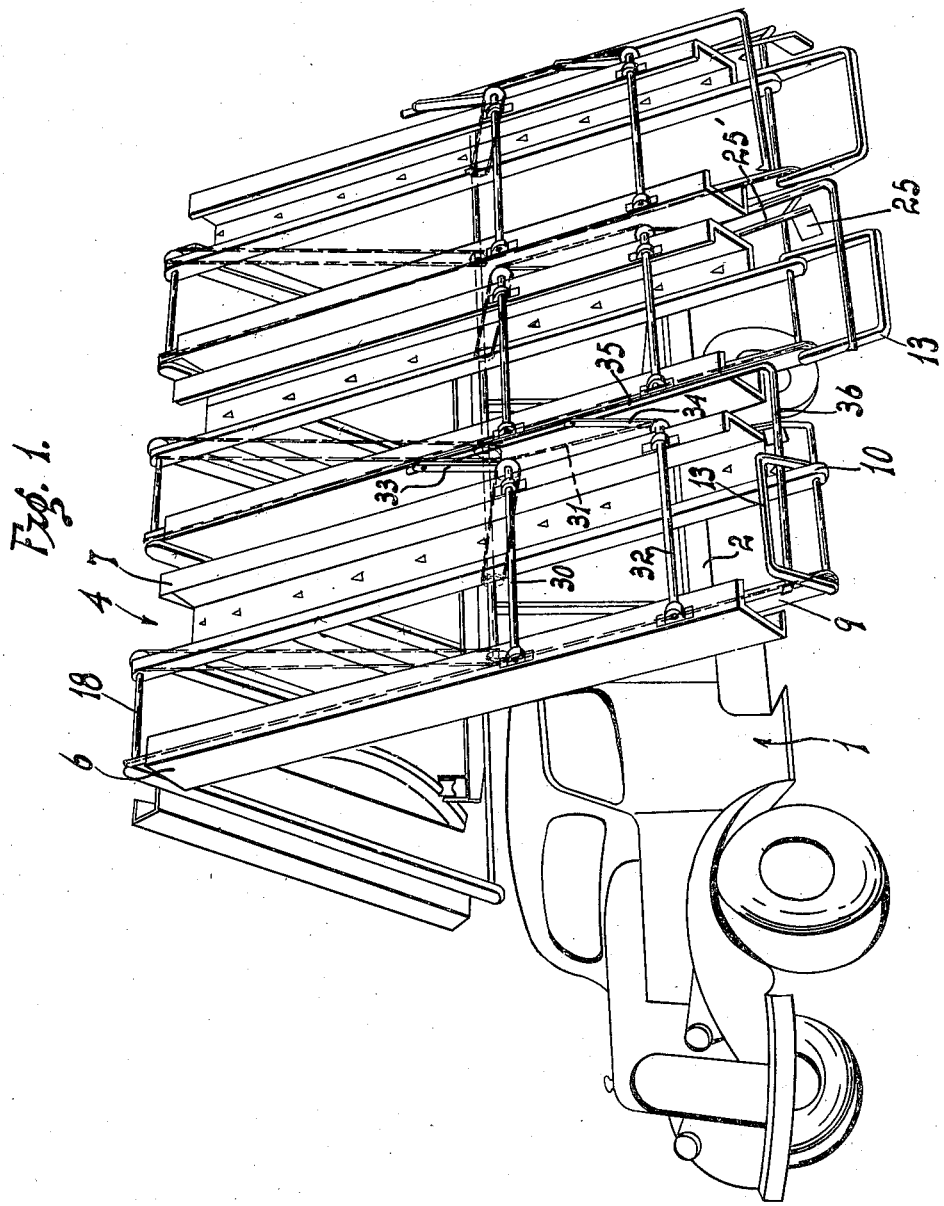
INVENTOR.
Manuel S. Alves.
BY
ATTORNEY.

Aug. 30, 1949.　　　　　M. S. ALVES　　　　　2,480,392
BALE AND SACK LOADER
Filed March 7, 1947　　　　　　　　　　　　　4 Sheets-Sheet 2
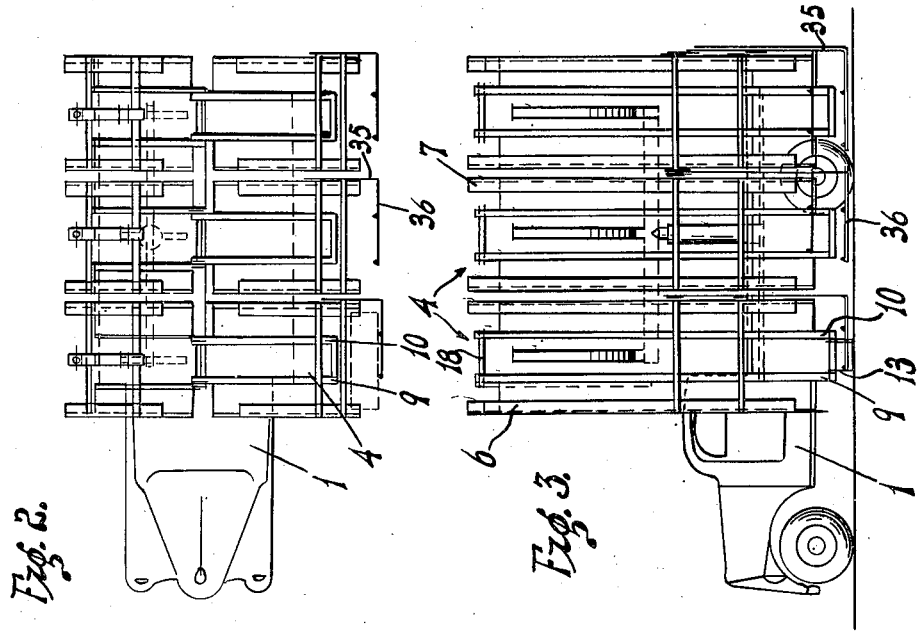
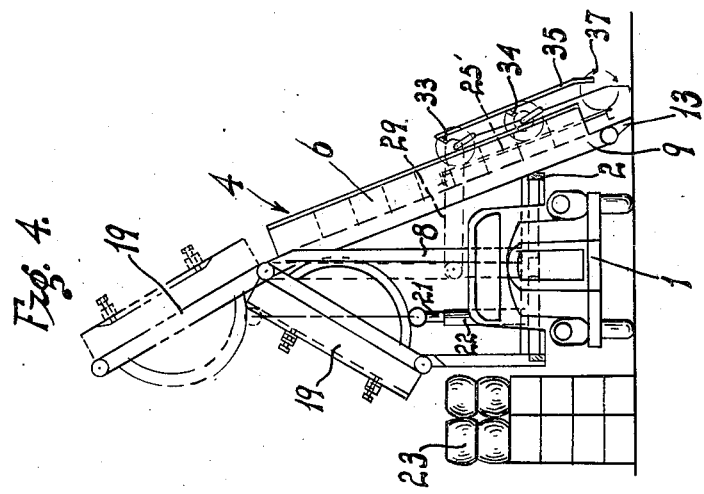
INVENTOR.
Manuel S. Alves.
BY
ATTORNEY.

Aug. 30, 1949.                M. S. ALVES                2,480,392
                           BALE AND SACK LOADER
Filed March 7, 1947                                  4 Sheets-Sheet 3

INVENTOR.
Manuel S. Alves.
BY
H. A. Dreckman
ATTORNEY.

Aug. 30, 1949.　　　　　M. S. ALVES　　　　　2,480,392
BALE AND SACK LOADER
Filed March 7, 1947　　　　　　　　　　　　4 Sheets-Sheet 4
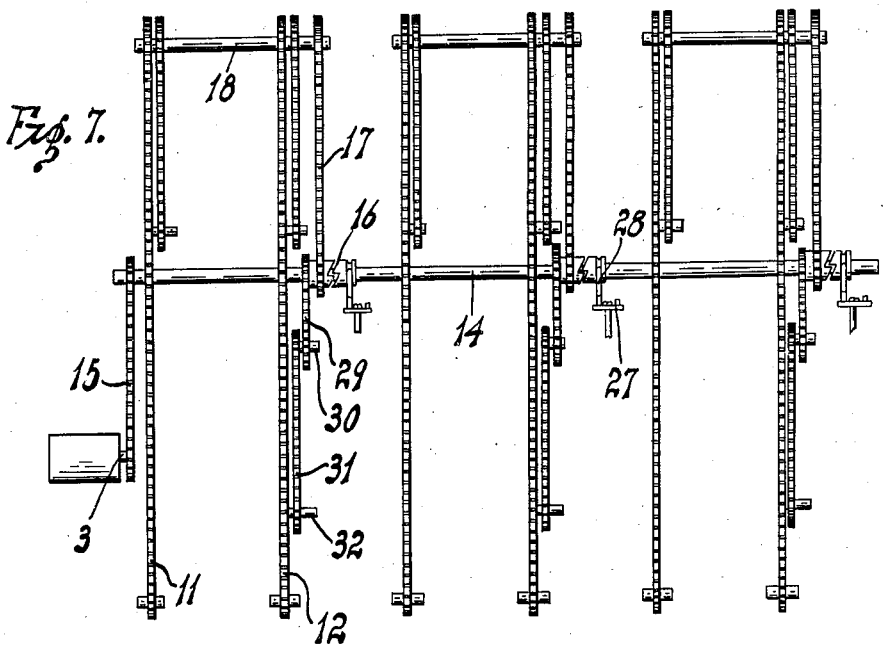
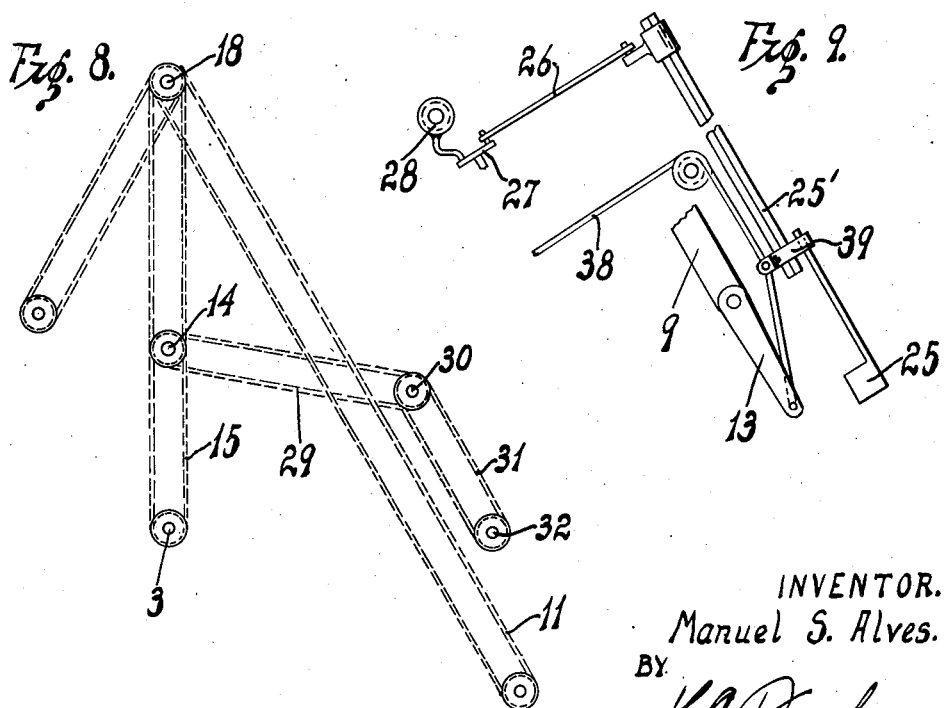
INVENTOR.
Manuel S. Alves.
BY
ATTORNEY.

Patented Aug. 30, 1949

2,480,392

UNITED STATES PATENT OFFICE 2,480,392

BALE AND SACK LOADER

Manuel S. Alves, Mount Shasta, Calif.

Application March 7, 1947, Serial No. 733,014

13 Claims. (Cl. 198—10)

This invention relates to a bale and sack loader whereby bales or sacks which are left in the field can be picked up by a truck and transported to a barn or the like for stacking and storage.

This invention is used particularly for the loading of bales of hay and the like and also for sacks of grain, the bales or sacks being left in the field and usually at spaced intervals all of which is usual and well known.

An object of my invention is to provide a loader for bales or sacks, the loader being mounted on a truck which can be moved into the field and the bale or sack being picked up automatically by the loading device as the driver moves the vehicle against the bale or sack.

An object of my invention is to provide a novel loader of the character stated which is provided with means of picking up a bale or sack and moving this bale or sack on to a conveyor chain, the chain in turn elevating the bale or sack in successive stages, until the entire loading rack is filled.

A feature of my invention resides in the novel unloader at the top of the loading rack, the unloader being adjustable so that the bales or sacks can be unloaded on to a stack.

Another object of my invention is to provide a novel pick-up means for the bale or sack, the pick-up means being actuated by a trigger engaged by the bale or sack.

Another feature of my invention is to provide a loader of the character stated which can be mounted on a standard truck and may be removed from the truck when it is desired to use this truck for other purposes.

Other objects, advantages and features of invention may appear from the accompanying drawing, the subjoined detailed description and the appended claims.

In the drawing—

Figure 1 is a perspective view of my bale or sack loader in position on a truck.

Figure 2 is a diagrammatic plan view of the same.

Figure 3 is a diagrammatic side elevation of the same.

Figure 4 is a diagrammatic front elevation of the same.

Figure 7 is a side elevation of the drive mechanism.

Figure 8 is an end view of the same.

Figure 9 is a fragmentary end view of the trigger mechanism for actuating the clutch.

Figure 5:
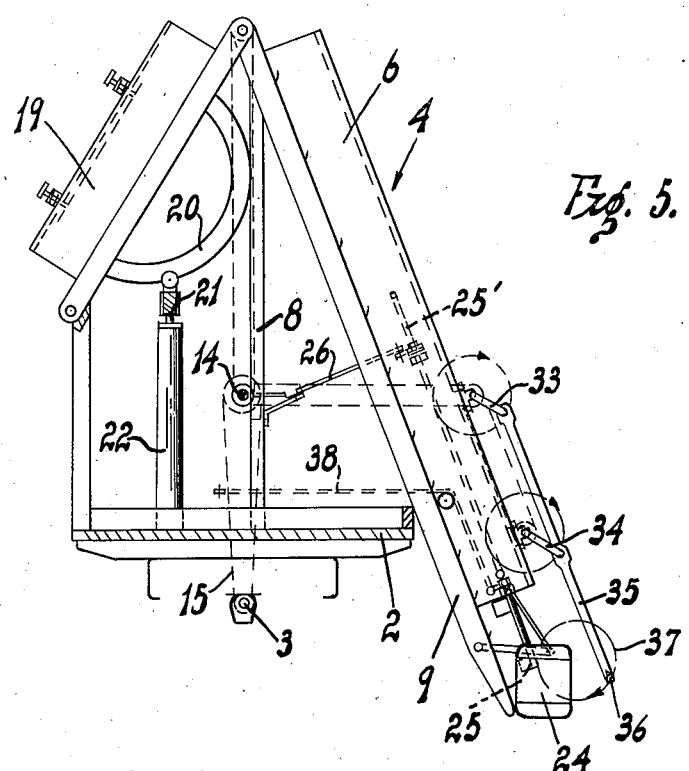
Figure 5 is a transverse sectional view of my loader.
Figure 6:
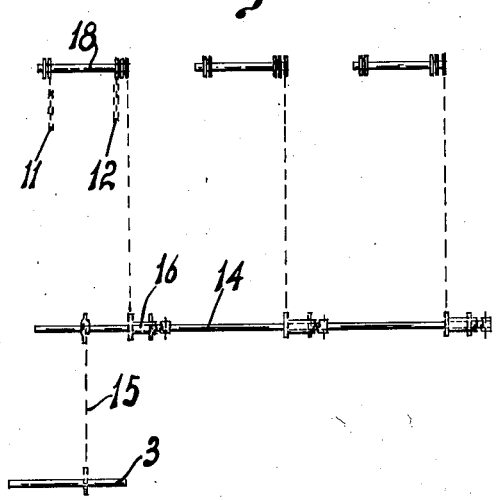
Figure 6 is a diagrammatic side view of the drive mechanism.

Referring more particularly to the drawing, the numeral 1 indicates a truck of usual and well known construction, which includes a bed 2. A power shaft 3 is driven by the engine of the truck, and this power shaft extends from the transmission, all of which is usual and well known, and is common on heavy commercial trucks. My loader consists of a plurality of loading racks 4 which are arranged one by the other throughout the length of the body 2, and these racks extend upwardly at an angle, and rest against one side of the bed 2, substantially as shown in Figures 4 and 5.

The purpose of providing a plurality of loaders is to enable the operator to fill one loader and then to successively fill the other loaders until all are completely filled, thus increasing the probable load and enabling the truck to move a large number of bales or sacks. Since the loaders are identical in construction, only one will be described in detail.

Each loader consists of a pair of spaced channel guide members 6—7, the depths of these channels being somewhat greater than the depth of the bale or sack. These channels also act as the frame members to provide a rigid structure, and to complete this frame vertical posts 8 rise from the bed 2 and are fixedly attached to the channels; thus providing an A-shaped frame of rigid construction. The channels 6—7 are inclined and rest on the edge of the truck bed 2. A rail 9—10 is fixedly mounted adjacent the channels 6—7 respectively; and these rails serve to guide chains 11—12 respectively. The chains are driven over sprockets over the top and bottom of the rails 9 and 10, and each chain is provided with suitable barbs to engage the bale or sack. A foot 13 is pivotally secured to the lower end of the rails 9—10; and this foot can be raised or lowered manually as will be subsequently described. The purpose of this foot is to act as a guide to the lower part of the rails 9 and 10, and the foot can be raised above ground level while the apparatus is being transported to or from the field.

The hoisting chains 11—12 are driven in the following manner: The power shaft 3 of the engine drives a jack shaft 14 which runs the length of the truck and is suitably journalled. A chain 15 drives the jack shaft 14 from the shaft 13, substantially as shown in Figures 5 to 8 inclusive. Clutches 16 are provided on the jack shaft 14, there being one clutch for each loading assembly. The method of engaging these clutches will be subsequently described. For the present purpose, it is stated that the clutch is engaged by the stationary bale or sack on the ground, and the clutch thereupon makes one revolution and then automatically disengages. From the driven member of the clutch 16, a chain 17 drives the shaft 18 which in turn carries the sprockets over which the chains 11 and 12 pass. When the bale or sack reaches the top of the rails 9—10 they drop into the inclined loader frame 19 which is hingedly attached to the top of the rails 9—10. This loader is in the form of a chute and includes an arcuate rail 20 which is engaged by the piston rod 21 of the hydraulic cylinder 22. The bale or sack then drops by gravity on to the stack 23. The loader 19 can be raised or lowered depending upon the height of the stack 23.

When loading the bales or sacks from the field, these articles are resting on the ground and scattered over the field. The loader is driven next to the bale 24 as shown in Figure 5. As the truck moves forwardly, the bale 24 engages the trigger 25. This trigger then partially rotates the shaft 25' and operates the drag link 26, which in turn rotates the disk 27 and moves the yoke 28 to engage a clutch 16. Since the shaft 14 is rotating continuously, engagement of the clutch 16 will drive the chain 17 and thence the shaft 18. Also, engagement of the clutch 16 will drive the chain 29 which in turn drives the shaft 30 and through the chain 31 drives the shaft 32. The shafts 30—32 each carry a crank arm 33—34 respectively, and these cranks are pivotally attached to a pick-up finger 35 which extends downwardly, and is provided with a forwardly extending bar 36. As the cranks 33—34 swing through three hundred sixty degrees, the arm 36 will be moved outwardly and then in an arc downwardly, and then upwardly as shown by the arrows 37, and this circular arc will cause the arm 36 to engage the bale or sack 24, pick it up and push it upwardly on to the hoisting chains 11—12. Since the clutch 16 is engaged during this three hundred sixty degree movement of the pick-up arm, the chains 11—12 will be moving and the bale is consequently engaged by the chains and moved a short distance. When the three hundred sixty degree movement of the pick-up arm is completed, the clutch 16 automatically disengages and the apparatus stops until the next bale is engaged in the same manner. When the forewardmost loader is completely filled, the foot 13, as well as the trigger 25 is pulled upwardly as shown in Figure 1. Thereupon, the adjacent loader is filled in the same manner.

To pull the foot 13, trigger 25, as well as the arm 36 out of the way, I provide a cable 38 which is attached to a clamp 39 on the shaft 25', and also to the lower end of the foot 13, substantially as shown in Figure 9. By pulling the cable 38 manually, the foot 13, as well as the trigger 25, will be swung upwardly. In swinging upwardly, the foot 13 also engages the arm 36 as shown in Figure 1 and also pulls this member out of the way. When going into the field, all of the parts 13, 25 and 36 are pulled upwardly so as to provide ample clearance. As each bale is encountered and engaged by the trigger 25, it is lifted on to the chains 11—12 until the entire space from top to bottom of the rails 9—10 is filled.

Thereupon, the next adjacent loader is filled, etc., until all of them have been completely filled. Thereafter, each loader is unloaded on to the part 19 and thence on to a stack 23 by simply holding each clutch 16 in engagement until the entire stack of articles has been moved off of the chains 11—12.

Having described my invention, I claim:

1. A bale and sack loader including a plurality of loaders adjacently arranged and adapted to be mounted on a vehicle each loader comprising a pair of spaced channels, said channels extending transversely of the vehicle and at a vertical angle thereto, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm.

2. A bale and sack loader including a plurality of loaders adjacently arranged and adapted to be mounted on a vehicle each loader comprising a pair of spaced channels, said channels extending transversely of the vehicle and at a vertical angle thereto, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm, trigger means engageable by the bale when resting on the ground, a clutch in said drive means, said trigger means actuating said clutch.

3. A bale and sack loader including a plurality of loaders adjacently arranged and adapted to be mounted on a vehicle each loader comprising a pair of spaced channels, said channels extending transversely of the vehicle and at a vertical angle thereto, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm, an unloader chute pivotally mounted on a horizontal pivot adjacent the upper end of said channels, and hydraulic means engaging said chute to swing said chute about its pivot.

4. A bale and sack loader adapted to be mounted on a vehicle comprising a pair of spaced channels, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm, trigger means engageable by the bale when resting on the ground, a clutch in said drive means, said trigger means actuating said clutch, an unloader chute pivotally mounted adjacent the upper end of said channels, and hydraulic means engaging said chute to swing said chute about its pivot.

5. A bale and sack loader adapted to be mounted on an engine driven truck comprising a pair of spaced channels, a pair of spaced pick-up chains mounted adjacent said channels, drive means for said chains extending from the truck engine, a pick-up arm, a finger on said arm, said finger engaging the bale to move said bale on to said chains, means mounting said arm for arcuate movement, said drive means extending to said arm, a foot pivotally mounted adjacent the lower end of said channels, and means to retract said foot.

6. A bale and sack loader adapted to be mounted on an engine driven truck comprising a pair of spaced channels, a pair of spaced pick-up chains mounted adjacent said channels, drive means for said chains extending from the truck engine, a pick-up arm, a finger on said arm, said finger engaging the bale to move said bale on to said chains, means mounting said arm for arcuate movement, said drive means extending to said arm, trigger means engageable by the bale when resting on the ground, a clutch in said drive means, said trigger means actuating said clutch, a foot pivotally mounted adjacent the lower end of said channels, and means to retract said foot.

7. A bale and sack loader adapted to be mounted on a vehicle comprising a pair of spaced channels, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm, an unloader chute pivotally mounted adjacent the upper end of said channels, and hydraulic means engaging said chute to swing said chute about its pivot, a foot pivotally mounted adjacent the lower end of said channels, and means to retract said foot.

8. A bale and sack loader adapted to be mounted on a vehicle comprising a pair of spaced channels, a pair of spaced pick-up chains mounted adjacent said channels, drive means for said chains, a pick-up arm, a finger on said arm, said finger engaging the bale to move said bale on to said chains, means mounting said arm for arcuate movement, said drive means extending to said arm, trigger means engageable by the bale when resting on the ground, a clutch in said drive means, said trigger means actuating said clutch, an unloader chute pivotally mounted adjacent the upper end of said channels, and hydraulic means engaging said chute to swing said chute about its pivot, a foot pivotally mounted adjacent the lower end of said channels, and means to retract said foot.

9. A bale and sack loader adapted to be mounted on a vehicle comprising a pair of spaced channels, a pair of spaced pick-up chains, rotatably mounted adjacent said channels, drive means for said chains, a pick-up arm, a finger on the lower end of said arm, said finger projecting substantially parallel to the lower end of said channels, and said finger engaging the bale to move the bale on to said chains, crank arms journalled adjacent one of said channels, said arm being mounted on said cranks, said drive means extending to said cranks to rotate the same, a trigger engageable by the bale when the bale is resting on the ground, a clutch in said drive means, a shaft extending from said trigger, said shaft being operatively connected to the clutch, whereby said clutch is engaged when the bale engages said trigger.

10. A bale and sack loader adapted to be mounted on a vehicle comprising a pair of spaced channels, a pair of spaced pick-up chains, rotatably mounted adjacent said channels, drive means for said chains, a pick-up arm, a finger on the lower end of said arm, said finger projecting substantially parallel to the lower end of said channels, and said finger engaging the bale to move the bale on to said chains, crank arms journalled adjacent one of said channels, said arm being mounted on said cranks, said drive means extending to said cranks to rotate the same, a trigger engageable by the bale when the bale is resting on the ground, a clutch in said drive means, a shaft extending from said trigger, said shaft being operatively connected to the clutch, whereby said clutch is engaged when the bale engages said trigger, a foot pivotally mounted adjacent the lower end of said channels, a manually operable cable attached to said foot and to said trigger whereby said trigger and foot may be retracted.

11. A bale and sack loader adapted to be mounted on a vehicle and comprising a plurality of independently operable loaders mounted adjacent each other on the vehicle, each loader comprising a pair of spaced channels, a pair of spaced pick-up chains rotatably mounted adjacent said channels, a power shaft, drive means extending from the vehicle to the power shaft, drive means extending from the power shaft to said chains, a pick-up arm, a finger on said arm, said finger engaging the bale to move the bale on to said chains, means mounting said arm for rotary movement, and drive means extending from the power shaft to said arm.

12. A bale and sack loader adapted to be mounted on a vehicle and comprising a plurality of independently operable loaders, each loader comprising a pair of spaced channels, a pair of spaced pick-up chains rotatably mounted adjacent said channels, a power shaft, drive means extending from the vehicle to the power shaft, drive means extending from the power shaft to said chains, a pick-up arm, a finger on said arm, said finger engaging the bale to move the bale on to said chains, means mounting said arm for rotary movement, and drive means extending from the power shaft to said arm, a trigger engageable by the bale when the bale is resting on the ground, a clutch on said power shaft, said first and last named drive means extending from the clutch, and means extending from the trigger to actuate said clutch.

13. A bale and sack loader adapted to be mounted on a vehicle and comprising a plurality of independently operable loaders, each loader comprising a pair of spaced channels, a pair of spaced pick-up chains rotatably mounted adjacent said channels, a power shaft, drive means extending from the vehicle to the power shaft, drive means extending from the power shaft to said chains, a pick-up arm, a finger on said arm, said finger engaging the bale to move the bale on to said chains, means mounting said arm for rotary movement, and drive means extending from the power shaft to said arm, a trigger engageable by the bale when the bale is resting on the ground, a clutch on said power shaft, said first and last named drive means extending from the clutch, and means extending from the trigger to actuate said clutch, a foot pivotally mounted adjacent the lower end of said channels, and means to retract said foot and trigger.

MANUEL S. ALVES.

REFERENCES CITED

The following references are of record in the file of this patent:

UNITED STATES PATENTS

| Number | Name | Date |
|---|---|---|
| 1,250,478 | McKenzie | Dec. 18, 1917 |
| 1,853,253 | Bennett | Apr. 12, 1932 |
| 2,312,779 | Smith | Mar. 2, 1943 |
| 2,357,600 | Pabst | Sept. 5, 1944 |
| 2,372,902 | Lewis | Apr. 3, 1945 |
| 2,397,570 | Smoker | Apr. 2, 1946 |
| 2,400,086 | Hansen | May 14, 1946 |
| 2,410,238 | Ringrose | Oct. 29, 1946 |
| 2,418,726 | Rogers, Jr. | Apr. 8, 1947 |